United States Patent
Almeida et al.

(10) Patent No.: US 10,827,210 B1
(45) Date of Patent: Nov. 3, 2020

(54) SYSTEMS AND METHODS FOR SIGNALING HOST DEVICES VIA A BROADCAST CHANNEL WITH GROUPING FILTERS

(71) Applicant: CSC Holdings, LLC, Bethpage, NY (US)

(72) Inventors: Heitor Almeida, Elmsford, NY (US); John Markowski, Smithtown, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

(21) Appl. No.: 15/373,168

(22) Filed: Dec. 8, 2016

(51) Int. Cl.
*H04N 7/025* (2006.01)
*H04N 21/262* (2011.01)
*H04N 21/222* (2011.01)
*H04N 21/443* (2011.01)

(52) U.S. Cl.
CPC ... *H04N 21/26291* (2013.01); *H04N 21/2221* (2013.01); *H04N 21/443* (2013.01)

(58) Field of Classification Search
CPC ......... H04N 21/23617; H04N 21/2393; H04N 21/262; H04N 21/26291; H04N 21/4349; H04N 21/25841
See application file for complete search history.

(56) References Cited

U.S. PATENT DOCUMENTS

| | | | | |
|---|---|---|---|---|
| 5,666,293 A * | 9/1997 | Metz | ................ | G06F 8/60 348/E5.006 |
| 5,768,539 A * | 6/1998 | Metz | ................ | G06F 8/60 348/E5.006 |
| 6,560,777 B2 * | 5/2003 | Blackketter | ............ | H04N 7/088 348/E7.031 |
| 7,197,715 B1 * | 3/2007 | Valeria | ................ | H04N 5/4401 348/E5.099 |
| 7,280,475 B2 * | 10/2007 | Tanaka | ................ | H04N 21/222 370/235 |
| 2002/0013949 A1 * | 1/2002 | Hejna, Jr. | ............... | H04L 29/06 725/100 |
| 2002/0143976 A1 * | 10/2002 | Barker | ................ | H04L 29/06 709/231 |
| 2002/0152467 A1 * | 10/2002 | Fiallos | ................ | H04L 29/06 725/50 |
| 2003/0219081 A1 * | 11/2003 | Sheehan | ............ | H04N 21/2362 375/316 |
| 2004/0034875 A1 * | 2/2004 | Bulkowski | ............. | H04N 7/088 725/136 |
| 2004/0156620 A1 * | 8/2004 | Horie | ................ | G11B 19/025 386/243 |

(Continued)

*Primary Examiner* — Pankaj Kumar
*Assistant Examiner* — Timothy R Newlin
(74) *Attorney, Agent, or Firm* — Sterne, Kessler, Goldstein & Fox P.L.L.C.

(57) ABSTRACT

Embodiments include a system, method, and a computer program product for broadcasting a universal message to a plurality subscriber devices. Embodiments include generating a universal message comprising information identifying one or more target subscriber devices from among the plurality of subscriber devices to execute an update or an event, broadcasting the universal message to each subscriber device of the plurality of subscriber devices, receiving a request, from the one or more target subscriber devices, to transmit a payload when the universal message comprises instructions to execute the update, and transmitting the payload to the one or more target subscriber devices.

20 Claims, 5 Drawing Sheets

(56) References Cited

U.S. PATENT DOCUMENTS

| | | | |
|---|---|---|---|
| 2005/0022237 A1* | 1/2005 | Nomura | H04N 5/44543 725/39 |
| 2005/0028206 A1* | 2/2005 | Cameron | H04N 7/17309 725/46 |
| 2005/0212504 A1* | 9/2005 | Revital | H04H 20/76 324/100 |
| 2006/0174271 A1* | 8/2006 | Chen | H04H 60/25 725/39 |
| 2007/0150892 A1* | 6/2007 | Chaney | G06F 8/61 717/177 |
| 2007/0220066 A1* | 9/2007 | Collacott | G06F 17/30017 |
| 2010/0058405 A1* | 3/2010 | Ramakrishnan | H04N 7/17318 725/97 |
| 2010/0070595 A1* | 3/2010 | Park | H04L 67/2823 709/206 |
| 2011/0307933 A1* | 12/2011 | Gavita | H04N 21/25858 725/112 |
| 2012/0174171 A1* | 7/2012 | Bouchard | H04N 21/25858 725/100 |
| 2014/0059180 A1* | 2/2014 | Giladi | H04L 65/602 709/219 |
| 2014/0280996 A1* | 9/2014 | Harrang | H04L 63/10 709/229 |
| 2016/0057464 A1* | 2/2016 | Bulkowski | H04N 7/088 725/32 |
| 2016/0156988 A1* | 6/2016 | Tam | H04L 51/046 725/35 |

* cited by examiner

SYSTEMS AND METHODS FOR SIGNALING HOST DEVICES VIA A BROADCAST CHANNEL WITH GROUPING FILTERS

BACKGROUND

Conventional cable systems support out-of-band download notifications using a via code version table (CVT). Out-of-band communications include transmitting the notifications in a channel separate from the data. For example, in out-of-band communications, a first dedicated channel is used for control signals and a second dedicated channel is used for data. In contrast, in-band communications include transmitting the notifications and data within the same channel or frequency. In conventional cable systems, notifications are possible when a set-top box (STB) has a Data Over Cable Service Interface Specification ("DOCSIS") tuner available and can process DOCSIS Set-Top Gateway ("DSG") multicast tunnels. Conventionally, the transmission of out-of-band messages has been carried over dedicated channels. The out-of-band messages are formatted according to applicable communications standards and protocols needed to implement the out-of-band messaging using DOCSIS as a transport. That is, out-of-band messaging is defined by the communications protocols and standards to be employed, and specifies data communication requirements and parameters that are common to all units.

BRIEF DESCRIPTION OF THE DRAWINGS/FIGURES

DETAILED DESCRIPTION OF EMBODIMENTS

Figure 1A:
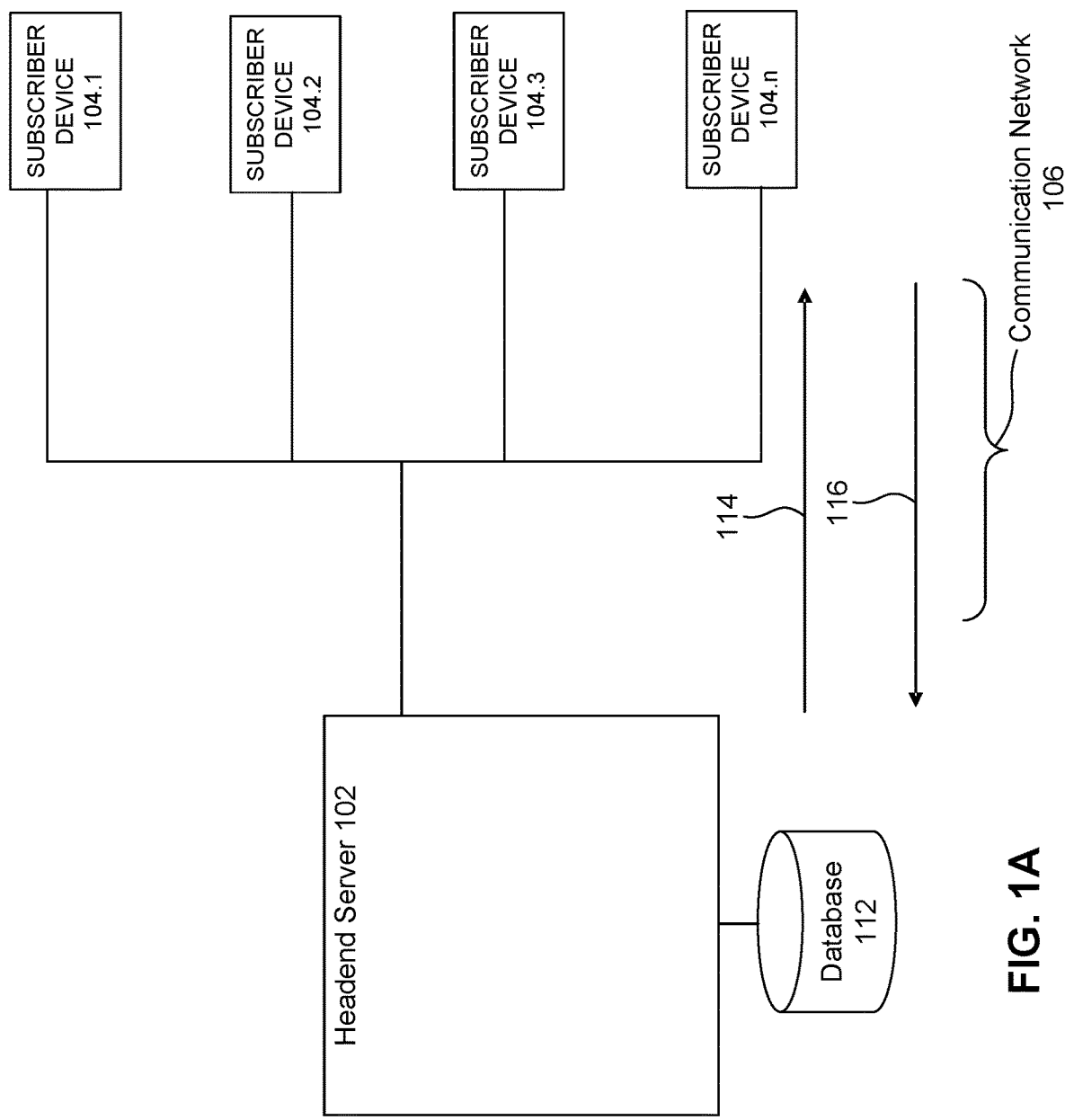
FIG. 1A illustrates a block diagram of an exemplary point-to-multipoint communication system according to aspects of the present disclosure.

Embodiments of the present disclosure provide a universal messaging system that broadcasts an in-band messaging bus service ("IMB message") to subscriber devices operating on different platforms, e.g., different set-top boxes, within the same cable system. As a result, when subscriber devices operating on a first platform are incorporated from a first cable system to a second cable system with subscriber devices operating on a second platform, the IMB message is designed such that all of the subscriber devices—regardless of their respective platform—can process the IMB message. That is, the IMB message is a universal message that can be broadcast to subscriber devices across any number or types of platforms. Thus, any subscriber device can process the IMB message using existing tuners without being updated to include additional tuners or DOCSIS tuners. Consequently, the use of the IMB message can reduce the cost of customer premise equipment ("CPE") and provide a reliable method to deliver updates at any time.

According to aspects of the present disclosure, the IMB message can be broadcast using digital video broadcasting/digital television constructions. In this way, the IMB message can be broadcast, with a single PID (package identification) having multiple tables, listings, or files to subscriber devices within a cable system. In contrast, application information table (AIT) or CVT use multiple tables resulting in complex mapping of the tables to the subscriber devices. In embodiments, to alleviate the complexity of mapping multiple PIDs, the IMB message is self-contained indicated by a single PID with multiple tables, listings, or files, in the private table domain, that is broadcast in every transport. The IMB message thus provides for an enhanced method for command and control for triggering an update or an event. Furthermore, the present disclosure provides a streamlined process for providing updates to all of the subscriber devices such that the subscriber devices can process the update when available or as specified in the IMB message.

In some embodiments, exemplary uses of the IMB message include:

1. sending a firmware update to all subscriber devices for a vendor and model;
2. sending an EPG update to all subscriber devices;
3. sending a firmware update for target group of customers, such as trial groups;
4. sending a firmware update to a region (geographic group) as a strategy of gradual code roll-out;
5. sending a firmware downgrade (roll back) to a geographic group
6. updating a select group of subscriber devices in production with debugging firmware;
7. sending a special firmware update for a range of MAC address;
8. sending a reboot schedule to all subscriber devices in different geographic locations; or
9. sending a Group ID for each geographic location to enable service discover.

Embodiments include a system, method, and a computer program product for broadcasting a universal message to a plurality of subscriber devices. Embodiments include generating a universal message comprising information identifying one or more target subscriber devices from among the plurality of subscriber devices to execute an update or an event, broadcasting the universal message to the plurality of subscriber devices, receiving a request, from the one or more target subscriber devices, to transmit a payload when the universal message comprises instructions to execute the update, and transmitting the payload to the one or more target subscriber devices.

FIG. 1A illustrates a block diagram of an exemplary point-to-multipoint communication system according to an embodiment of the present disclosure. A communication system 100 facilitates bi-directional communication of information, such as video, audio, and/or data to provide some examples, between a headend server 102 and subscriber devices 104.1 through 104.n. It can be beneficial for a provider of a service to provide updates to the subscriber devices 104.1 through 104.n. As used herein, the term "downstream direction 114" refers to the transfer of information in a first direction from the headend server 102 to the subscriber devices 104.1 through 104.n. The term "upstream direction 116" refers to the transfer of information in a second direction from the subscriber devices 104.1 through 104.n to the headend server 102. As illustrated in FIG. 1A, the communication system 100 includes the headend server 102, the subscriber devices 104.1 through 104.n, a communication network 106, and a database 112.

As illustrated in FIG. 1A, the headend server 102 communicates with the subscriber devices 104.1 through 104.*n* over the communication network 106 in the downstream direction 114. In embodiments, the headend server 102 broadcasts a universal message, e.g., the IMB message, to the subscriber devices 104.1 through 104.*n* that includes information such that the subscriber devices 104.1 through 104.*n* operating on different platforms can process the IMB message. The communication network 106 provides a point-to-multipoint topology for the high speed, reliable, and secure transport of information between the headend server 102 and the subscriber devices 104.1 through 104.*n*. In embodiments, the subscriber devices 104.1 through 104.*n* are set-top boxes. As will be appreciated by those skilled in the relevant art(s), the communication network 106 may include coaxial cable, fiber optic cable, or a combination of coaxial cable and fiber optic cable linked via one or more fiber nodes, and may include frequency translation devices in support of a frequency stacking architecture, and may even include wireless links without departing from the spirit and scope of the present disclosure. In an exemplary embodiment, the headend server 102 can be implemented as a cable modem termination system (CMTS) of a cable communication system, as an optical line terminal (OLT) of a Passive Optical Network (PON), or as any other suitable centralized entity in a point-to-multipoint communication system that will be apparent to those skilled in the relevant art(s) without departing from the spirit and scope of the present disclosure.

The headend server 102 can be a computing device, implemented on one or more processors. In embodiments, cable providers can provide equipment updates to the subscriber devices 104.1 through 104.*n* via the headend server 102. For example, the headend server 102 can generate the IMB message that is broadcast to the subscriber devices 104.1 through 104.*n* regardless of the operating platform of the subscriber device. According to aspects of the present disclosure, the IMB message includes a single PID indicating one or more subscriber devices from among the subscriber devices 104.1 through 104.*n* that are targeted to receive the update(s). The PID can specify whether the update(s) is a service configuration update for one or more subscriber devices 104.1 through 104.*n* operating on a first platform (or a second platform), whether the update is a service configuration for a group of one or more subscriber devices 104.1 through 104.*n*, a service transport list, a configuration file update, a profile update, a regular firmware update, a fallback firmware update, a remote control firmware update, a user-interface configuration update, an electronic program guide (EPG) update, a Wi-Fi pairing update, and/or an instruction to reboot one or more of the subscriber devices 104.1 through 104.*n*. It should be understood by those of ordinary skill in the art that these are merely exemplary updates, and that other updates are further contemplated according to aspects of the present disclosure. In embodiments, the PID can start using a fixed bit within the IMB message, i.e., a same start bit within each IMB message broadcasted to the subscriber devices 104.1 through 104.*n*. Consequently, each of the subscriber devices 104.1 through 104.*n* can recognize the start of PID.

Furthermore, the IMB message can include one or more messages delivered to the subscriber devices 104.1 through 104.*n*. For example, the IMB message includes a target message that further includes one or more destination messages, one or more schedule messages, one or more locator messages, and/or one or more filter messages. In embodiments, the IMB message can also include a transport stream ID (TSID) field that is used by the subscriber devices 104.1 through 104.*n* to download the updates.

In embodiments, the headend server 102 broadcasts the IMB message with information to target payloads in the Digital Storage Media Command and Control (DSM-CC) protocol. In this way, the headend server 102 broadcasts the IMB message in a carousel. That is, the headend server 102 periodically delivers the IMB message in a data stream, such that the IMB message can be broadcast to the subscriber devices 104.1 through 104.*n* simultaneously. In turn, the subscriber devices 104.1 through 104.*n* can "tune" to the data stream at any given time and are able to reconstitute the IMB message into a data file.

In embodiments, the headend server 102 can broadcast the IMB message can at approximately 30 Kbits/sec. In further embodiments, the headend server 102 broadcasts the IMB message at approximately 30 Kbits/second when the IMB message is sent periodically, e.g., once every 10 seconds. The periodic transmission of the IMB message enables the subscriber devices 104.1 through 104.*n* to "tune" to the transmission stream at a random time and still be able to receive to IMB message. Although the headend server 102 can broadcast IMB message at approximately 30 Kbits/sec every 10 seconds, it should be understood by those of ordinary skill in the art that other bandwidths and periods are also contemplated by the present disclosure. In embodiments, the headend server 102 can broadcast the IMB message using more or less bandwidth based on the size of the IMB message. For example, in embodiments the headend server 102 can generate the IMB message using 209 bytes of data, i.e., two elementary stream packages, and can transmit the IMB message to the subscriber devices 104.1 through 104.*n* in less than 1 second in a burst of approximately 3 Kbits/sec. In further embodiments, the headend server 102 can generate the IMB message using 12,135 bytes of data, i.e., approximately 200 elementary stream packages, and transmit the IMB message to the subscriber devices 104.1 through 104.*n* in less than 1 second in a burst of approximately 300 Kbits/sec. According to aspects of the present disclosure, the size of the IMB message, the bandwidth required to broadcast the IMB message, and the periodicity of the broadcast can be configured based on the number of updates being broadcast to the subscriber devices 104.1 through 104.*n*, the number of groups of subscriber devices 104.1 through 104.*n* being targeted for the update(s), and/or the size of the group(s) of subscriber devices 104.1 through 104.*n*.

In embodiments, to generate the IMB message, the headend server 102 can query a database 112 for information. For example, the headend server 102 can query the database 112 for the current version of the operating firmware, configuration file, fallback firmware, remote control firmware, user-interface configuration, or electronic programming guide (EPG) being implemented. Using this information, the headend server 102 can generate the IMB message notifying one or more of the subscriber devices 104.1 through 104.*n* of the most up-to-date version of the firmware, configuration file, etc. Upon receipt of the IMB message, each of the subscriber devices 104.1 through 104.*n* can process the IMB message to determine whether an update is necessary and to download the update when appropriate.

Alternatively, or additionally, the headend server 102 can query the database 112 for the platform of the subscriber devices 104.1 through 104.*n*. In this way, headend server 102 can generate the IMB message such that the IMB message targets subscriber devices operating on a particular platform. Even further, in some embodiments, the headend server 102 can query the database 112 for specific a vendor(s) (i.e., manufacturer(s)) of one or more of the subscriber devices 104.1 through 104.*n* and a particular subscriber device model of the vendor.

Alternatively, or additionally, the headend server 102 can query the database 112 for location information of one or more of the subscriber devices 104.1 through 104.*n*. For example, a cable provider may want to roll-out (or roll-back) a version of firmware, configuration files, EPG, etc., in a given location, such as a zip code. As such, the headend server 102 can query the database 112 for the location to receive the update and generate the IMB message using this information. Consequently, when regionalization is necessary, the headend server 102 can generate the IMB message with information to target one or more of the subscriber devices 104.1 through 104.*n* within a specified geographic region. In this way, the headend server 102 can broadcast the IMB message using a transport stream that is separated per geographic location. Thus, in embodiments, headend server 102 can broadcast the IMB message to multiple geographic areas at the same time with each geographic area being identified with a unique Group ID. As a result, the headend server 102 can support all geographic locations and all subscriber devices combinations using the universal message.

In an embodiment, the headend server 102 can receive requests to transmit a payload to containing the updates from the one or more targeted subscriber devices 104.1 through 104.*n*. In response, the headend server 102 can transmit the payload to the one or more targeted subscriber devices 104.1 through 104.*n*. Furthermore, the headend server 102 can receive notifications from the one or more targeted subscriber devices 104.1 through 104.*n* indicating that the update(s) has been executed. For example, the headend server 102 can receive a response from subscriber device 104.1 indicating that subscriber device 104.1 received and processed the command from the cable provider to update one or more of its operating firmware, configuration file, fallback firmware, remote control firmware, user-interface configuration, or electronic programming guide (EPG).

The subscriber devices 104.1 through 104.*n* are computing devices used for two-way data communications with the headend server 102. In embodiments, the subscriber devices 104.1 through 104.*n* include a cable modem for enabling the two-way data communications. The two-way communications can be implemented using a DOCSIS-based standard. Thus, the subscriber devices 104.1 through 104.*n* can receive the IMB message from the headend server 102 and download the payload from the headend server 102 when the IMB message indicates that the subscriber device is targeted for an update. Additionally, the subscriber devices 104.1 through 104.*n* can send an acknowledgement to the headend server 102 indicating that the update(s) has been downloaded and installed.

In embodiments, the subscriber devices 104.1 through 104.*n* include tuners and demodulators. The tuners, e.g., such as a QAM tuner, can receive the IMB message through one or more of the following means: coaxial cable for receiving cable broadcasts, satellite for satellite broadcasts, and antenna for terrestrial broadcasts. In embodiments, the subscriber devices 104.1 through 104.*n* process an IMB message using as many tuners available. Furthermore, in embodiments, the subscriber devices 104.1 through 104.*n* can download the updates in parallel using as many tuners available to optimize the time to provide service back to the subscriber. In embodiments, the tuner can perform a frequency carousel to select a frequency to download the payload from the headend server 102.

The subscriber devices 104.1 through 104.*n* can process the IMB message to determine whether it is targeted for an update. Based on content of the IMB message, the subscriber devices 104.1 through 104.*n* can download the payload from the headend server 102, execute the update in accordance with the instructions of the IMB message, and notify the headend server 102 that the update has been executed. To process the IMB message, the subscriber devices 104.1 through 104.*n* can execute a bootstrap process for starting the subscriber devices 104.1 through 104.*n*. For example, the subscriber devices 104.1 through 104.*n* can execute the bootstrap processing using the fallback firmware or the regular firmware.

In embodiments, one or more of the subscriber devices 104.1 through 104.*n* can execute the bootstrap processing using the fallback firmware when there is an issue with the regular firmware. These issues include, but are not limited to, image corruption, hardware failure, etc. When one or more of the subscriber devices 104.1 through 104.*n* executes the bootstrap using the fallback firmware, the one or more of the subscriber devices 104.1 through 104.*n* processes the IMB message to retrieve the regular firmware. In some embodiments, the one or more of the subscriber devices 104.1 through 104.*n* processes the IMB message only to download the regular firmware when performing the bootstrap process using the fallback firmware because the fallback firmware is designed to fix the regular firmware. Furthermore, when executing the bootstrap process using the fallback firmware, the one or more of the subscriber devices 104.1 through 104.*n* can support QAM DSM-CC and HTTP communication protocols. Alternatively, in embodiments, one or more of the subscriber devices 104.1 through 104.*n* can execute the bootstrap process using the regular firmware. When the one or more of the subscriber devices 104.1 through 104.*n* executes the bootstrap using the regular firmware, the one or more of the subscriber devices 104.1 through 104.*n* can process the IMB message in its entirety.

In embodiments, as a part of the bootstrap process, the subscriber devices 104.1 through 104.*n* can perform a channel discovery process. For example, the subscriber devices 104.1 through 104.*n* can scan a frequency range until the subscriber devices 104.1 through 104.*n* discover a first available frequency with a valid transport stream carrying the IMB message. Once the subscriber devices 104.1 through 104.*n* discover the first available frequency, the subscriber devices 104.1 through 104.*n* processes the IMB message to determine whether it is being targeted for an update, to identify the update to be executed, to identify a time for executing the update, and to identify where to locate the update.

To determine whether the IMB message is targeting a particular subscriber device, the subscriber devices 104.1 through 104.*n* can process the destination message. In embodiments, when the destination message indicates that a given subscriber device is being targeted for an update, the targeted subscriber device from among the subscriber devices 104.1 through 104.*n* can further extract a plant ID of the destination message in subsequently broadcasted IMB messages. In further embodiments, when one or more subscriber devices 104.1 through 104.*n* executes the bootstrap process using the fallback firmware, the one or more subscriber devices 104.1 through 104.*n* only processes the plant ID of the IMB message. Alternatively, in embodiments, when one or more subscriber devices 104.1 through 104.*n* executes the bootstrap process using the regular firmware the first time (i.e., after each firmware update), the one or more subscriber devices 104.1 through 104.*n* can process each of the tables, listings, or files of the IMB message. In further embodiments, when the one or more subscriber devices 104.1 through 104.*n* is started with a "cold reboot" (i.e., the one or more subscriber devices 104.1 through 104.*n* has been previously booted with the current firmware), the one or more subscriber devices 104.1 through 104.*n* can process the IMB messages in parallel to optimize the platform boot up and provide service to the subscriber as quickly possible.

To further determine whether the IMB message is targeting a particular subscriber device, the one or more subscriber devices 104.1 through 104.*n* can process the filter message of the IMB message. In this way, the subscriber devices 104.1 through 104.*n* can determine whether they are targets for an update.

The one or more subscriber devices 104.1 through 104.*n* can also process the PID of the IMB message to determine which update is to be executed by the subscriber device. In embodiments, the updates include, but are not limited to, a plant ID or a group ID for service configuration, different firmware updates, user-interface ("UP") updates, electronic program guide ("EPG") updates, subscriber device reboot instructions, a profile update, Wi-Fi pairing update, and other notifications. In embodiments, the firmware updates include, but are not limited to, an operating firmware update, a fallback firmware update, a remote control firmware update, etc.

To determine when to execute the update, the one or more subscriber devices 104.1 through 104.*n* can process the schedule message of the IMB message. In this way, the one or more subscriber devices 104.1 through 104.*n* can determine whether to execute the update immediately, after the next reboot, when the subscriber device is in a standby mode, when a tuner is available, and/or at a specific time. In embodiments, when the update includes a reboot instruction, the one or more subscriber devices 104.1 through 104.*n* processes the schedule message and executes the reboot command at the specific time in the schedule message.

When one or more subscriber devices 104.1 through 104.*n* is targeted for an update, the one or more subscriber devices 104.1 through 104.*n* can process the service transport list message. After processing the service transport list message, the one or more targeted subscriber devices 104.1 through 104.*n* can identify each possible frequency for the transport service channel. In embodiments, the one or more targeted subscriber devices 104.1 through 104.*n* can retrieve an initial list of frequencies for the transport service channel, and when none of the frequencies are the transport service channel, the one or more targeted subscriber devices 104.1 through 104.*n* can process all remaining possible frequencies to identify the transport service channel. That is, the one or more targeted subscriber devices 104.1 through 104.*n* can perform a frequency carousel to identify the transport service channel. In embodiments, to identify the transport stream, the one or more targeted subscriber devices 104.1 through 104.*n* can look for the TSID which indicates the transport service channel.

In addition to analyzing each possible frequency for the transport service channel, the one or more targeted subscriber devices 104.1 through 104.*n* can process the IMB message using other transmission protocols as described herein. For example, the one or more targeted subscriber devices 104.1 through 104.*n* can process the locator message of the IMB message to determine where to locate the update.

In embodiments, the one or more targeted subscriber devices 104.1 through 104.*n* can process the IMB message using other transmission protocols in parallel with analyzing each possible frequency for the transport service channel. In further embodiments, the one or more targeted subscriber devices 104.1 through 104.*n* can process the IMB message using other transmission protocols when there is no available frequency for the transport service channel.

When the one or more targeted subscriber devices 104.1 through 104.*n* processes the IMB message using the frequency carousel and alternate protocols in parallel, the one or more targeted subscriber devices 104.1 through 104.*n* can synchronize the processing of the IMB message. Subsequently, the one or more targeted subscriber devices 104.1 through 104.*n* can transmit a request for the payload to the headend server 102, download the payload(s) comprising the update(s) based on the content of the IMB message, and check the downloaded payload(s) for errors. When the payloads are error free, the one or more targeted subscriber devices 104.1 through 104.*n* can execute the updates, synchronize the updates upon completion, and notify the headend server 114 that the updates have been completed.

The subscriber devices 104.1 through 104.*n* can store the various firmware, the configuration file, and/or the EPG in a memory. In embodiments, the subscriber devices 104.1 through 104.*n* can download updates from the headend server 102 and store the updates in the memory.

Figure 1B:
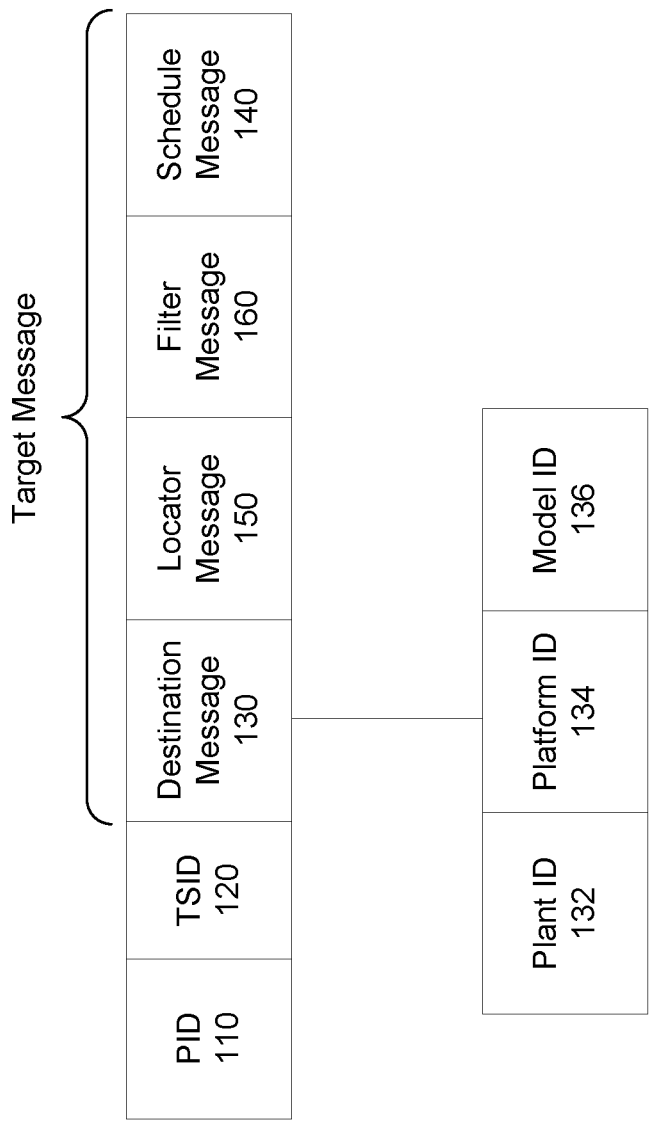
FIG. 1B illustrates an example universal message according to aspects of the present disclosure.

FIG. 1B illustrates an example universal message according to aspects of the present disclosure. According to aspects of the present disclosure, the universal message is an IMB message. The IMB message includes a single PID 110 indicating one or more subscriber devices from among the subscriber devices 104.1 through 104.*n* targeted to receive the update. In embodiments, the PID 110 can be an 8-bit message transmitted to the subscriber devices 104.1 through 104.*n*. For example, the PID 110 can specify whether the update is a service configuration update for subscriber devices 104.1 through 104.*n* operating on a first platform, whether the update is a service configuration for a group of subscriber devices 104.1 through 104.*n*, a service transport list, a configuration file update, a profile update, a regular firmware update, a fallback firmware update, a remote control firmware update, a user-interface configuration update, an EPG update, a Wi-Fi pairing update, or an instruction to reboot the subscriber devices 104.1 through 104.*n*. It should be understood by those of ordinary skill in the art that these are merely exemplary updates, and that other updates are further contemplated according to aspects of the present disclosure. In embodiments, the PID 110 can start using a fixed bit, i.e., a same start bit within each IMB message broadcasted to the subscriber devices 104.1 through 104.*n*, such that subscriber devices 104.1 through 104.*n* recognize the start of the PD.

In embodiments, the IMB message can also include a transport stream ID (TSID) 120 that is used by the subscriber devices 104.1 through 104.*n* to download the updates.

In embodiments, the IMB message includes a plurality of messages delivered to each of the subscriber devices 104.1 through 104.*n*. For example, the IMB message includes one or more target messages that further includes one or more destination messages 130, one or more schedule messages 140, one or more locator messages 140, and/or one or more filter messages 160. The destination message 130 includes a plant ID 132 indicating whether the update is for all of the subscriber devices 104.1 through 104.*n*, a first group of subscriber devices 104.1 through 104.*n* operating on a first platform, or a second group of subscriber devices 104.1 through 104.*n* operating on a second platform. In embodiments, the plant ID 132 can be a 32 bit message that indicates whether all subscriber devices 104.1 through 104.*n* are targeted for the update, the first group of subscriber devices 104.1 through 104.*n* are targeted for the update, or the second group of subscriber devices 104.1 through 104.*n* are targeted for the update. For example, when a value of the plant ID 132 is "0," all of the subscriber devices 104.1 through 104.*n* are targeted for the update, when the value of the plant ID 132 is "1," the first group of subscriber devices 104.1 through 104.*n* are targeted for the update, and when the value of the plant ID 132 is "2," the second group of subscriber devices 104.1 through 104.*n* are targeted for the update.

When the plant ID 132 indicates that the IMB message is for a particular platform (e.g., the first platform or the second platform), the destination message can further include a platform ID 134 identifying a particular vendor that manufactures the subscriber devices that operate on the particular platform. In embodiments, the platform ID 134 can be a 64 bit message that indicates whether all subscriber devices 104.1 through 104.*n* operating on the first platform are targeted for the update or whether subscriber devices 104.1 through 104.*n* manufactured by a specific vendor are targeted for the update. For example, when a value of the platform ID 134 is "0," all of the subscriber devices 104.1 through 104.*n* are targeted for the update, whereas, a non-zero value can specify the particular vendor.

Even further, in some embodiments, when a particular vendor is identified, the destination message can further include a model ID 136 identifying a particular model of a subscriber device manufactured by the vendor identified by the platform ID 134. In embodiments, the model ID 136 can be a 64 bit message that indicates whether all subscriber devices 104.1 through 104.*n* manufactured by the vendor are targeted for the update or whether specific models of the subscriber devices 104.1 through 104.*n* manufactured by the specific vendor are targeted for the update. For example, when a value of the model ID 136 is "0," all of the subscriber devices 104.1 through 104.*n* are targeted for the update, whereas, a non-zero value can specify the particular model of the vendor.

The filter message 160 includes information to target a particular subscriber device or group of subscriber devices, such that targeted subscriber devices can process the update, whereas non-targeted subscriber devices can disregard the update. For example, the information of the filter message 160 includes an 8-bit message instructing the subscriber devices 104.1 through 104.*n* which subscriber devices are targeted for the update, with a value of the 8-bit message instructing the subscriber devices 104.1 through 104.*n* which subscriber device(s) is being targeted. In embodiments, the filter message 160 includes a first value specifying a target subscriber device to process the update based on a chip identification ("ID") of the subscriber device, a second value specifying a target subscriber device to process the update based on a MAC address of the subscriber device, third and fourth values specifying a target subscriber device to process the update based on an Internet Protocol version, e.g., IPv4 or IPv6, respectively, of the subscriber device, a fifth value specifying a target subscriber device to process the update based on a group ID of the subscriber device, a sixth value specifying a target subscriber device to process the update based on a bouquet ID of the subscriber device, a seventh value specifying a target subscriber device to process the update based on a network ID of the subscriber device, an eighth value specifying a subscriber device to process the update based on a service group ID, or a ninth value specifying that all subscriber devices 104.1 through 104.*n* are targeted. For example, the tenth message value can be "0," thereby indicating that all of the subscriber devices 104.1 through 104.*n* are target subscriber devices. However, when the 8-bit message value is a non-zero value, the filter message 160 can target specified subscriber devices 104.1 through 104.*n*. In this way, the filter message 160 can be used to target all subscriber devices, a group of subscriber devices, or even a single subscriber device. It should be understood by those of ordinary skill in the art that these are merely exemplary identifiers of the subscriber devices 104.1 through 104.*n*, and that other identifiers or filter values are further contemplated according to aspects of the present disclosure.

The schedule message 140 includes information directing the one or more targeted subscriber devices 104.1 through 104.*n* when to execute the update. For example, the information of the schedule message 140 includes an 8-bit message instructing the one or more targeted subscriber devices 104.1 through 104.*n* when to execute the update, with each bit indicating when to execute the update. In embodiments, a first bit can instruct the one or more targeted subscriber devices 104.1 through 104.*n* to execute the update immediately, a second bit can instruct the one or more targeted subscriber devices 104.1 through 104.*n* to execute the update after the next reboot, a third bit can instruct the one or more targeted subscriber devices 104.1 through 104.*n* to execute the update when in a standby mode, a fourth bit can instruct the one or more targeted subscriber devices 104.1 through 104.*n* to execute the update when a tuner is available, or a fifth bit can instruct the one or more targeted subscriber devices 104.1 through 104.*n* to execute the update at a specific time, e.g., at 1:00 am. In embodiments, when the IMB message includes a reboot instruction, the IMB message includes the fifth bit instructing the one or more targeted subscriber devices 104.1 through 104.*n* to execute the reboot command at a specific time. It should be understood by those of ordinary skill in the art that these are merely exemplary instructions for when to execute the updates, and that other instructions for when to execute the updates are further contemplated according to aspects of the present disclosure.

The locator message 150 includes information directing the one or more targeted subscriber devices 104.1 through 104.*n* where to locate the update. For example, the information of the locator message 150 includes an 8-bit message instructing the subscriber devices 104.1 through 104.*n* where to locate the update, with a value of the 8-bit message indicating where to locate the update. In embodiments, a first value can instruct the subscriber devices 104.1 through 104.*n* to retrieve the update using a QAM frequency, a second value can instruct the one or more targeted subscriber devices 104.1 through 104.*n* to retrieve the update using the DSM-CC in-band QAM, a third value can instruct the one or more targeted subscriber devices 104.1 through 104.*n* to retrieve the update using HTTP, a fourth value can instruct the one or more targeted subscriber devices 104.1 through 104.*n* to retrieve the update using HTTPS, a fifth value can instruct the one or more targeted subscriber devices 104.1 through 104.*n* to retrieve the update using FTP, a sixth value can instruct the one or more targeted subscriber devices 104.1 through 104.*n* to retrieve the update using TFTP, a seventh value can instruct the one or more targeted subscriber devices 104.1 through 104.*n* to retrieve the update using SFTP, or an eighth value can instruct the one or more targeted subscriber devices 104.1 through 104.*n* to retrieve the update using Wi-Fi. It should be understood by those of ordinary skill in the art that these are merely exemplary protocols for retrieving the updates, and that other values or protocols for retrieving the updates are further contemplated according to aspects of the present disclosure.

In embodiments, when the locator message 150 indicates that the update can be located using the DSM-CC Inband QAM, a uniform resource locator (URL) format may include a DSM-CC carousel ID, a program number in the target transport stream, an ID associated with the TSID, and a target frequency for the target transport stream. When the DSM-CC carousel ID is 0, then the first DSM-CC stream in a program map table (PMT) list can be used. Furthermore, when the program number is 0, no PMT lookup is necessary. Lastly, when the TSID is 0, then any transport stream can be used.

Figure 2:
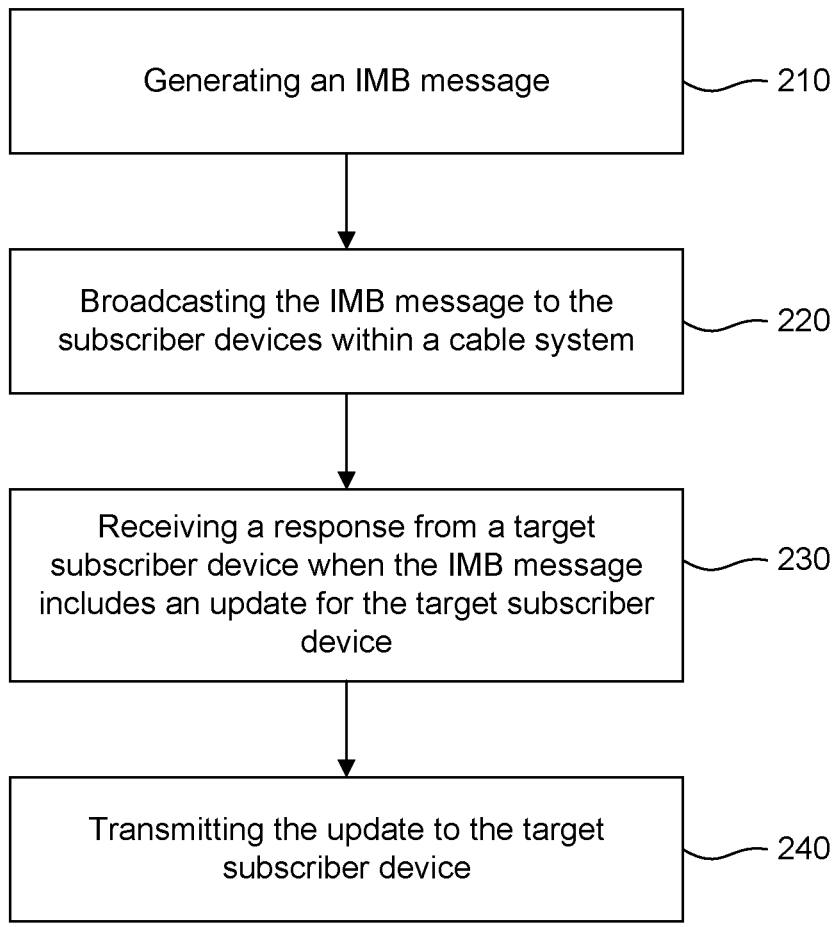
FIG. 2 illustrates an example of a process flow for sending updates to a plurality of subscriber devices in a cable system according to aspects of the present disclosure.

FIG. 2 illustrates an example of a process flow for sending updates to a plurality of subscriber devices in a cable system. A process flow 200 includes: generating an IMB message 210; broadcasting the IMB message to the subscriber devices within a cable system 220; receiving a response from a target subscriber device when the IMB message includes an update for the target subscriber device 230; and transmitting the update to the target subscriber device 240.

In embodiments, the generating the IMB message 210 may include generating the IMB message with information identifying one or more subscriber devices 104.1 through 104.n to receive an update, identifying the update to be executed, identifying a time for executing the update, and identifying where to locate the update as discussed herein. In embodiments, the updates includes, but are not limited to, a plant ID or a group ID for service configuration, different firmware updates, user-interface ("UP") updates, electronic program guide ("EPG") updates, subscriber device reboot instructions, a profile update, Wi-Fi pairing update, or other notifications. In embodiments, the firmware updates include, but are not limited to, an operating firmware update, a fallback firmware update, a remote control firmware update, etc.

In embodiments, the generating the IMB message 210 may include generating the IMB message with a single PID indicating the subscriber devices 104.1 through 104.n targeted to receive the update. In embodiments, the PID can be an 8-bit message transmitted to the subscriber devices 104.1 through 104.n. For example, the PID can specify whether the update is a service configuration update for subscriber devices 104.1 through 104.n operating on a first platform, whether the update is a service configuration for a group of subscriber devices 104.1 through 104.n, a service transport list, a configuration file update, a profile update, a regular firmware update, a fallback firmware update, a remote control firmware update, a user-interface configuration update, an EPG update, a Wi-Fi pairing update, or an instruction to reboot the subscriber device. In embodiments, the IMB message can also include a transport stream ID (TSID) that is used by the subscriber devices 104.1 through 104.n to download the updates. In embodiments, the PID can start using a fixed bit, i.e., a same start bit within each IMB message broadcasted to the subscriber devices 104.1 through 104.n, such that subscriber devices 104.1 through 104.n recognize the start of the PD.

In embodiments, the generating the IMB message 210 may include generating the IMB message with a plurality of messages for the subscriber devices 104.1 through 104.n. For example, the IMB message includes a target message that further includes a destination message, a schedule message, a locator message, and a filter message as discussed with respect to FIG. 1B. In embodiments, the generating the IMB message 210 may include generating the IMB message with the destination message indicating whether the update is for all of the subscriber devices 104.1 through 104.n, a first group of subscriber devices 104.1 through 104.n operating on a first platform, or a second group of subscriber devices 104.1 through 104.n operating on a second platform. When the information indicates that the IMB message is for a particular platform, the generating the IMB message 210 may include generating the IMB message with information identifying a particular vendor that manufactures subscriber devices 104.1 through 104.n that operate on the particular platform. Even further, in some embodiments, when a particular vendor is identified, the generating the IMB message 210 may include generating the IMB message with information identifying a particular model of a subscriber device manufactured by the identified vendor.

The generating the IMB message 210 may include generating the IMB message with the schedule message directing the subscriber devices 104.1 through 104.n when to execute the update. For example, the information can instruct the subscriber devices 104.1 through 104.n to execute the update immediately, after the next reboot, when the subscriber device is in a standby mode, when a tuner is available, and/or at a specific time. In embodiments, when the update includes a reboot instruction, the IMB message includes the information instructing the subscriber devices 104.1 through 104.n execute the reboot command at a specific time.

The generating the IMB message 210 may include generating the IMB message with the locator message directing the subscriber devices 104.1 through 104.n where to locate the update. For example, the information can instruct the subscriber devices 104.1 through 104.n to locate the update using the QAM frequency, the DSM-CC in-band QAM, HTTP, HTTPS, FTP, TFTP, SFTP, or Wi-Fi. It should be understood by those of ordinary skill in the art that these are merely exemplary protocols for locating the updates, and that other protocols for locating the updates are further contemplated according to aspects of the present disclosure.

The generating the IMB message 210 may include generating the IMB message with the filter message to identify one or more target subscriber devices 104.1 through 104.n. For example, the information can specifying a subscriber device to process the update based on a chip identification ("ID") of the subscriber device, a MAC address of the subscriber device, an Internet Protocol version of the subscriber device, a group ID of the subscriber device, a bouquet ID of the subscriber device, a network ID of the subscriber device, or a service group ID of the subscriber device. Alternatively, the information can specify that all subscriber devices are targeted. In this way, the filter message can be used to target all subscriber devices, a group of subscriber devices, or even a single subscriber device. It should be understood by those of ordinary skill in the art that these are merely exemplary identifiers of the subscriber devices, and that other identifiers or filter values are further contemplated according to aspects of the present disclosure.

The broadcasting the IMB message to each subscriber device within the cable system 220 may include periodically broadcasting the IMB message to each subscriber device. In embodiments, the IMB message can be broadcast in accordance with the DSM-CC protocol. In this way, the IMB message can be broadcast in a carousel. That is, the IMB message can be periodically delivered in a data stream, such that the IMB message can be broadcast to all of the subscriber devices 104.1 through 104.*n* 150 simultaneously. In embodiments, the IMB message can broadcast at approximately 30 Kbits/sec. In further embodiments, the IMB message can broadcast at approximately 30 Kbits/second when the IMB message is sent periodically, e.g., once every 10 seconds. In embodiments, the IMB message can be broadcast using more or less bandwidth based on the size of the IMB message.

The receiving a response from a target subscriber device when the IMB message includes an update for the target subscriber device 230 may include receiving a request to download the payload after the target subscriber device has processed the IMB message. The transmitting the update to the target subscriber device 240 may include transmitting the payload to the target subscriber device after receiving the request to download the payload from the target subscriber device.

Figure 3:
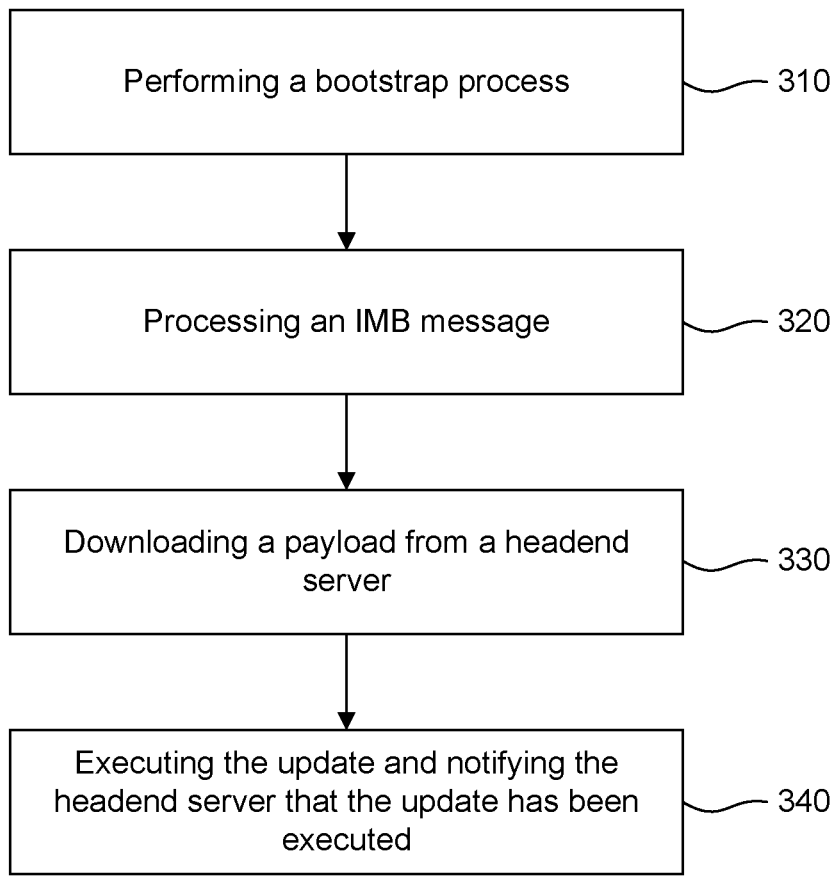
FIG. 3 illustrates an example of a process flow for processing an IMB message in an subscriber device according to aspects of the present disclosure.

FIG. 3 illustrates an example of a process flow for processing an IMB message in an subscriber device. A process flow 300 includes: performing a bootstrap process 310; processing an IMB message 320; downloading a payload from a headend server 330; and executing the update and notifying the headend server that the update has been executed 340.

In embodiments, the performing a bootstrap process 310 may include starting an subscriber device using the fallback firmware of the subscriber device or the regular firmware of the subscriber device. In embodiments, the starting the subscriber device using the fallback firmware can be performed when there is an issue with the regular firmware. When executing the bootstrap process using the fallback firmware, the subscriber device processor can process an IMB message to retrieve the regular firmware. Alternatively, in embodiments, when executing the bootstrap process using the regular firmware the subscriber device can process the IMB message in its entirety. In further embodiments, the performing a bootstrap process 310 may include performing a channel discovery. The channel discovery may include scanning a frequency range until the subscriber device discovers an available frequency with a valid transport stream carrying the IMB message.

The processing the IMB message 320 may include processing the IMB message to determine whether the subscriber device is being targeted for an update, to identify the update to be executed, to identify a time for executing the update, and to identify where to locate the update. In embodiments, the determining whether the subscriber device is being targeted may include processing the destination message of the IMB message. In embodiments, the destination message includes a plant ID, a platform ID, and a model ID as discussed herein. In embodiments, when the bootstrap process 310 is performed using the fallback firmware, the subscriber device need only process the plant ID of the destination message. Alternatively, in embodiments, when the bootstrap process 320 is performed using the regular firmware for the first time (i.e., after each firmware update), the subscriber device can process each message of the IMB message. In further embodiments, when the bootstrap process 320 is performed using the regular firmware in a "cold reboot" (i.e., the subscriber device has been previously booted with the current firmware), the subscriber device can process the messages in parallel to optimize the platform boot up and provide service to the subscriber as quickly as possible.

The processing the IMB message 320 to determine whether the IMB message is targeting the subscriber device can further include processing the filter message of the IMB message. The filter message can target an subscriber device or group of subscriber devices to receive the update based on a chip identification ("ID") of the subscriber device, a MAC address of the subscriber device, an Internet Protocol version of the subscriber device, a group ID of the subscriber device, a bouquet ID of the subscriber device, a network ID of the subscriber device, or a service group ID. Alternatively, the information can specify that all subscriber devices are targeted. Based on the filter message, the subscriber device can determine whether it is targeted for the update.

The processing the IMB message 320 can further include processing the PID of the IMB message to determine which update is to be executed by the subscriber device. In embodiments, the updates includes, but are not limited to, a plant ID or a group ID for service configuration, different firmware updates, user-interface ("UP") updates, electronic program guide ("EPG") updates, subscriber device reboot instructions, a profile update, Wi-Fi pairing update, and other notifications. In embodiments, the firmware updates include, but are not limited to, an operating firmware update, a fallback firmware update, a remote control firmware update, etc.

The processing the IMB message 320 can further include processing the schedule message of the IMB message to determine when to execute the update. The schedule message includes information directing the subscriber devices when to execute the update, such as immediately, after the next reboot, when the subscriber device is in a standby mode, when a tuner is available, and/or at a specific time. Based on this information, the subscriber device can process the IMB message to determine when to execute the update.

The processing the IMB message 320 can further include processing the service transport list message of the IMB message. In embodiments, the service transport list message includes each possible frequency for a transport service channel. After processing the service transport list message, the subscriber device can identify each possible frequency for the transport service channel as discussed herein (e.g., using a frequency carousel).

The processing the IMB message 320 can further include processing the locator message of the IMB message to determine where to locate the update. For example, the processing the IMB message 320 can further include processing the IMB message using other transmission protocols as described herein. In embodiments, processing the IMB message using other transmission protocols can be performed in parallel with the analyzing each possible frequency for the transport service channel. In further embodiments, processing the IMB message using other transmission protocols can be performed when there is no available frequency for the transport service channel. The processing the IMB message 320 can further include synchronizing the frequency carousel and the alternate protocols when the IMB message is processed in parallel.

The downloading the payload from a headend server 330 may include downloading the payload when the IMB message includes an update for the subscriber device. In embodiments, the downloading the IMB message further includes checking the payload for errors.

The executing the update and notifying the headend server that the update has been executed 340 may include executing the update in accordance with the schedule message of the IMB message. Furthermore, the executing the update and notifying the headend server that the update has been executed 340 may include synchronizing the updates upon completion and notifying the headend server that the updates have been completed.

Figure 4:
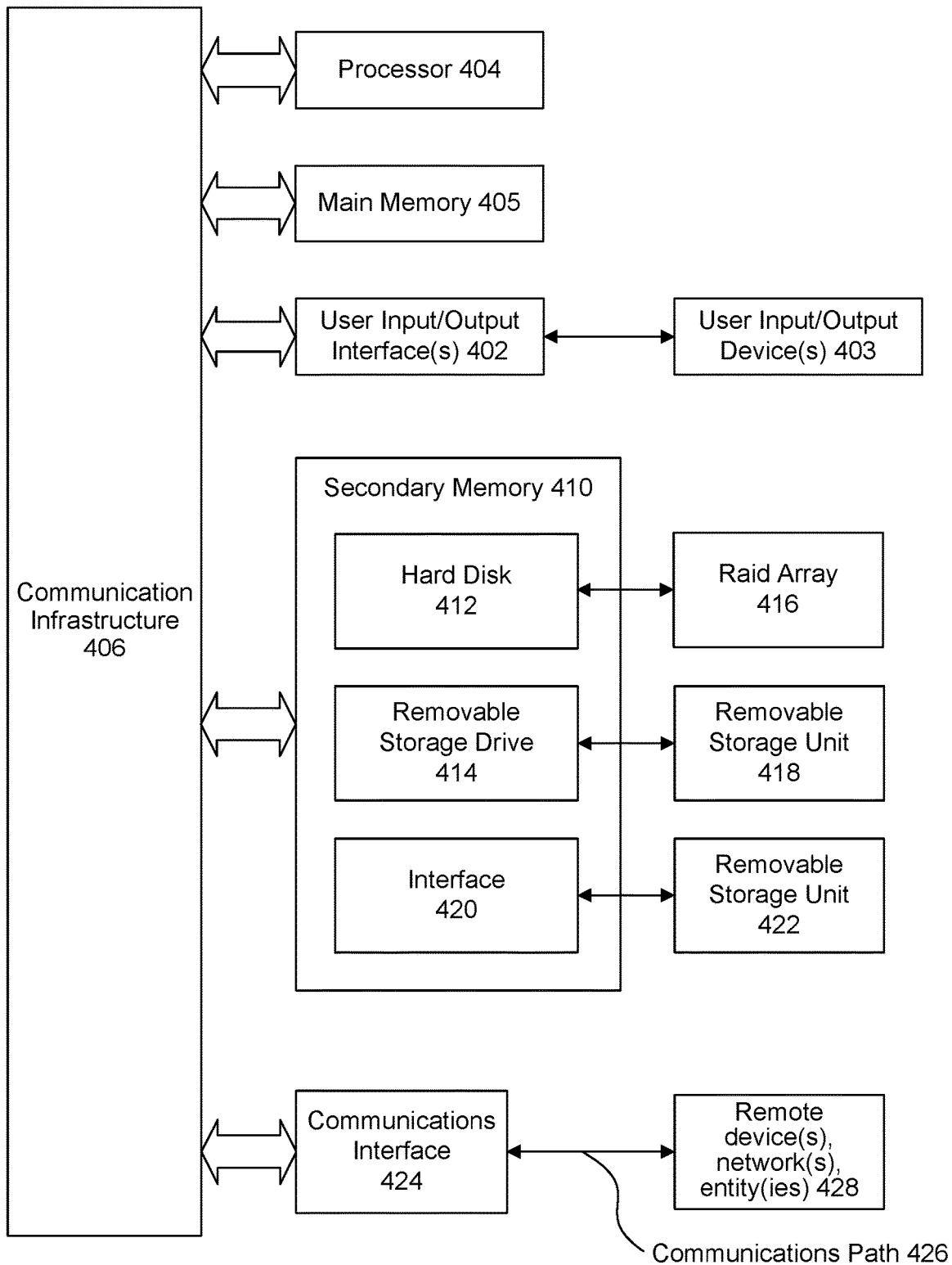
FIG. 4 illustrates an example computer system which can be used to implement embodiments according to aspects of the present disclosure according to aspects of the present disclosure.

Various aspects of the disclosure can be implemented by software, firmware, hardware, or a combination thereof. FIG. 4 illustrates an example computer system 400 in which some embodiments, or portions thereof, can be implemented as computer-readable code. Various embodiments are described in terms of the example computer system 400. After reading this description, it will become apparent to a person skilled in the relevant art how to implement the embodiments using other computer systems and/or computer architectures.

Computer system 400 includes one or more processors, such as processor 404. Processor 404 may comprise suitable logic, circuitry, dedicated circuits, and/or code that may enable processing data and/or controlling operations of computer system 400. Processor 404 can be a special purpose or a general purpose processor. Processor 404 is connected to a communication infrastructure 406 (for example, a bus or network). Processor 404 may be enabled to provide control signals to the various other portions of computer system 400 via communication infrastructure 406, for example.

Computer system 400 also includes a main memory 408, and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium can also refer to memories, such as main memory 408 and secondary memory 410, which can be memory semiconductors (e.g., DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the embodiments as discussed herein. In particular, the computer programs, when executed, enable processor 404 to implement the disclosed processes. Accordingly, such computer programs represent controllers of the computer system 400. Where the embodiments are implemented using software, the software may be stored in a computer program product and loaded into computer system 400 using removable storage drive 414, interface 420, hard drive 412 or communications interface 424. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system for broadcasting a universal message to a plurality of subscriber devices, the system comprising:
    a headend server configured to:
        generate the universal message comprising information identifying at least two subscriber devices from among the plurality of subscriber devices targeted to receive an update, the at least two subscriber devices operating on different platforms from each other and being within a specified geographic region from among a plurality of geographic regions serviced by the headend server,
        wherein the information identifying the at least two subscriber devices is configured and arranged within the universal message to be recognized by the different platforms as targeting the at least two subscriber devices to receive the update,
        periodically broadcast the universal message to the at least two subscriber devices over a plurality of time intervals to provide a plurality of universal messages, the plurality of universal messages including a first universal message broadcast during a first time interval from among the plurality of time intervals and a second universal message broadcast during a second time interval from among the plurality of time intervals,
        receive a plurality of signals from the at least two subscriber devices, a first signal from among the plurality of signals indicating a first subscriber device from among the at least two subscriber devices has processed the first universal message and a second signal from among the plurality of signals indicating a second subscriber device from among the at least two subscriber devices has processed the second universal message, and
        transmit a payload to the at least two subscriber devices using a transport stream corresponding to the specified geographic region from among a plurality of transport streams in response to receiving the plurality of signals, the plurality of transport streams corresponding to different geographic regions from among the plurality of geographic regions; and
    a database that stores information for broadcasting the universal message to the at least two subscriber devices.

2. The system of claim 1, wherein the universal message comprises a single package identification (PID) identifying the update to be executed by the at least two subscriber devices.

3. The system of claim 1, wherein the universal message comprises a plurality of messages.

4. The system of claim 3, wherein the plurality of messages comprises:
    a first message identifying the at least two subscriber devices based on the different platforms of the at least two subscriber devices;
    a second message identifying the at least two subscriber devices based on identifiers of the at least two subscriber devices;
    a third message instructing the at least two subscriber devices when to execute the update; and
    a fourth message instructing the at least two subscriber devices where to locate the update.

5. The system of claim 1, wherein the headend server is configured to generate the universal message based on updates stored in the database.

6. The system of claim 1, wherein the update comprises one or more of a configuration file update, a profile update, a regular firmware update, a fallback firmware update, a remote control firmware update, a user-interface configuration update, an electronic program guide (EPG) update, or a Wi-Fi pairing update.

7. The system of claim 1, wherein the information identifying the at least two subscriber devices is configured and arranged to start at a fixed bit location within the universal message.

8. A method for broadcasting a universal message to a plurality of subscriber devices, the method comprising:
generating the universal message comprising information identifying at least two subscriber devices from among the plurality of subscriber devices targeted to receive an update, the at least two subscriber devices operating on different platforms from each other and being within a specified geographic region from among a plurality of geographic regions serviced by the headend server,
wherein the information identifying the at least two subscriber devices is configured and arranged within the universal message to be recognized by the different platforms as targeting the at least two subscriber devices to receive the update;
periodically broadcasting the universal message to the at least two subscriber devices over a plurality of time intervals to provide a plurality of universal messages, the plurality of universal messages including a first universal message broadcast during a first time interval from among the plurality of time intervals and a second universal message broadcast during a second time interval from among the plurality of time intervals;
receiving a plurality of signals from the at least two subscriber devices, a first signal from among the plurality of signals indicating a first subscriber device from among the at least two subscriber devices has processed the first universal message and a second signal from among the plurality of signals indicating a second subscriber device from among the at least two subscriber devices has processed the second universal message; and
transmitting a payload to the at least two subscriber devices using a transport stream corresponding to the specified geographic region from among a plurality of transport streams in response to receiving the plurality of signals, the plurality of transport streams corresponding to different geographic regions from among the plurality of geographic regions.

9. The method of claim 8, wherein the generating the universal message comprises generating universal message with a single package identification (PID) identifying the update to be executed by the at least two subscriber devices.

10. The method of claim 8, wherein the generating the universal message comprises generating the universal message with a plurality of messages.

11. The method of claim 10, wherein the plurality of messages comprises:
a first message identifying the at least two subscriber devices based on the different platforms of the at least two subscriber devices;
a second message identifying the at least two subscriber devices based on identifiers of the at least two subscriber devices;
a third message instructing the at least two subscriber devices when to execute the update; and
a fourth message instructing the at least two subscriber devices where to locate the update.

12. The method of claim 8, wherein the generating the universal message comprises generating the universal message based on updates stored in a database.

13. The method of claim 8, wherein the update comprises one or more of a configuration file update, a profile update, a regular firmware update, a fallback firmware update, a remote control firmware update, a user-interface configuration update, an electronic program guide (EPG) update, or a Wi-Fi pairing update.

14. A non-transitory computer readable medium storing one or more instructions for execution by one or more processors, the one or more instructions, when executed by the one or more processors, configure the one or more processors to perform operations, the operations comprising:
generating a universal message comprising information identifying at least two subscriber devices from among a plurality of subscriber devices targeted to receive an update, the at least two subscriber devices operating on different platforms from each other and being within a specified geographic region from among a plurality of geographic regions serviced by the headend server,
wherein the information identifying the at least two subscriber devices is configured and arranged within the universal message to be recognized by the different platforms as targeting the at least two subscriber devices to receive the update;
periodically broadcasting the universal message to the at least two subscriber devices over a plurality of time intervals to provide a plurality of universal messages, the plurality of universal messages including a first universal message broadcast during a first time interval from among the plurality of time intervals and a second universal message broadcast during a second time interval from among the plurality of time intervals;
receiving a plurality of signals from the at least two subscriber devices, a first signal from among the plurality of signals indicating a first subscriber device from among the at least two subscriber devices has processed the first universal message and a second signal from among the plurality of signals indicating a second subscriber device from among the at least two subscriber devices has processed the second universal message; and
transmitting a payload to the at least two subscriber devices using a transport stream corresponding to the specified geographic region from among a plurality of transport streams in response to receiving the plurality of signals, the plurality of transport streams corresponding to different geographic regions from among the plurality of geographic regions.

15. The method of claim 8, wherein the generating comprises:
generating the universal message to include the information identifying the at least two subscriber devices starting at a fixed bit location within the universal message.

16. The non-transitory computer readable medium of claim 14, wherein the generating the universal message comprises generating universal message with a single package identification (PID) identifying the update to be executed by the at least two subscriber devices.

17. The non-transitory computer readable medium of claim 14, wherein the generating the universal message comprises generating the universal message with a plurality of messages, the plurality of messages comprising:
a first message identifying the at least two subscriber devices based on the different platforms of the at least two subscriber devices;
a second message identifying the at least two subscriber devices based on identifiers of the at least two subscriber devices;
a third message instructing the at least two subscriber devices when to execute the update; and
a fourth message instructing the at least two subscriber devices where to locate the update.

18. The non-transitory computer readable medium of claim 14, wherein the generating the universal message comprises generating the universal message based on updates stored in a database.

19. The non-transitory computer readable medium of claim 14, wherein the update comprises one or more of a configuration file update, a profile update, a regular firmware update, a fallback firmware update, a remote control firmware update, a user-interface configuration update, an electronic program guide (EPG) update, or a Wi-Fi pairing update.

20. The non-transitory computer readable medium of claim 14, wherein the information identifying the at least two subscriber devices is configured and arranged to start at a fixed bit location within the universal message.

* * * * *